US009218424B2

(12) United States Patent
Hariharan et al.

(10) Patent No.: US 9,218,424 B2
(45) Date of Patent: Dec. 22, 2015

(54) CONTENT FILTERING FOR PERSONAL PRODUCTIVITY APPLICATIONS

(71) Applicant: International Business Machines Corporation, Armonk, NY (US)

(72) Inventors: Rajaraman Hariharan, Sunnyvale, CA (US); Krishna C. Kumar, Dharmapuri (IN); Srinivasan S. Muthuswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/309,967

(22) Filed: Jun. 20, 2014

(65) Prior Publication Data

US 2015/0149921 A1 May 28, 2015

Related U.S. Application Data

(63) Continuation of application No. 14/089,969, filed on Nov. 26, 2013.

(51) Int. Cl.
*G06F 17/30* (2006.01)
*G06F 7/00* (2006.01)
*G06Q 10/10* (2012.01)
*G06F 3/0481* (2013.01)
*G06F 3/0484* (2013.01)
*H04L 29/08* (2006.01)
*H04L 12/58* (2006.01)

(52) U.S. Cl.
CPC ........ *G06F 17/30867* (2013.01); *G06F 3/0481* (2013.01); *G06F 3/0484* (2013.01); *G06Q 10/10* (2013.01); *H04L 51/00* (2013.01); *H04L 67/30* (2013.01); *H04L 67/306* (2013.01); *G06F 17/30702* (2013.01); *G06F 17/30761* (2013.01)

(58) Field of Classification Search
CPC .................... G06F 17/30702; G06F 17/30761; G06F 17/30867; G06Q 10/10
USPC ........................................................ 707/754
See application file for complete search history.

(56) References Cited

U.S. PATENT DOCUMENTS 7,027,463 B2    4/2006 Mathew et al.
2006/0164986 A1*  7/2006 Rinne ........................... 370/231
(Continued)

FOREIGN PATENT DOCUMENTS

CN    104679812 A    6/2015

OTHER PUBLICATIONS

Basso et al., "Critical Capabilities for Mobile Device Management", Aug. 8, 2012 ID: G00230106, pp. 1-16, Licensed for Distribution, Gartner, <http://www.trinitysaintdavid.ac.uk/en/media/uniweb/content/documents/departments/informationservices/studentinformation/airwatch_report.pdf>.
"Oracle Beehive: A Flexible Collaboration Platform for the Enterprise", An Oracle White Paper, Aug. 2010, pp. 1-15, <http://www.oracle.com/us/products/middleware/beehive/026988.pdf>.
(Continued)

*Primary Examiner* — Kuen Lu
(74) *Attorney, Agent, or Firm* — Stephen R. Yoder

(57) ABSTRACT

A set of context profiles containing profile content rules for filtering which content within a set of personal productivity applications (such as e-mail, chat, calendar, and contacts applications) is accessible by a user. Content rules support filtering content by, for example, content originator, and/or subject matter. The context profiles are centrally maintained for control of integrated, non-integrated, and/or independently administered personal productivity applications.

4 Claims, 13 Drawing Sheets

(56) References Cited

U.S. PATENT DOCUMENTS

| | | |
|---|---|---|
| 2008/0320000 A1 | 12/2008 | Gaddam |
| 2009/0204677 A1 | 8/2009 | Michaelis et al. |
| 2010/0100542 A1* | 4/2010 | Hawthorne et al. ............ 707/732 |
| 2011/0113471 A1* | 5/2011 | Hjelm et al. ....................... 726/1 |
| 2011/0276632 A1 | 11/2011 | Anderson et al. |
| 2012/0209839 A1 | 8/2012 | Andrews et al. |
| 2012/0311659 A1 | 12/2012 | Narain et al. |
| 2015/0149489 A1 | 5/2015 | Hariharan et al. |

OTHER PUBLICATIONS

"Samsung Enterprise Mobility Solutions", Horizontal Solutions Portfolio, pp. 1-24, provided in search report dated Jan. 22, 2013, <http://www.samsung.com/sg/business-images/resource/RR-CL/2012/07/EBT_1208_EBTsource_HorizontalBrouchure_BR-0.pdf>.

U.S. Appl. No. 14/089,969 entitled "Content Filtering for Personal Productivity Applications", Filed Nov. 26, 2013.

* cited by examiner

CONTENT FILTERING FOR PERSONAL PRODUCTIVITY APPLICATIONS

FIELD OF THE INVENTION

The present invention relates generally to the field of computer network communications, and more particularly to communicating data generated and/or displayed through personal productivity applications.

BACKGROUND OF THE INVENTION

Personal devices such as mobile phones, notebooks, and tablets have seen rapid adoption for both business and personal use. Personal devices are portable and have a high computing capacity. Oftentimes, users run multiple personal productivity applications using a single device. Device users improve productivity by having access to multiple sources of information on a single device. These personal productivity applications, such as e-mail, chat, calendar, and contacts applications, are frequently and heavily used to improve the effectiveness of a user's daily life.

Personal devices allow a user to completely hide or prevent access to certain applications according to the user's preference. For example, the application and/or device may be protected by guest mode preferences via a guest login that only provides access to designated files and/or applications.

SUMMARY

In one aspect of the present invention, a method, computer program product, and system includes: defining a plurality of context profiles by the use of context profile rules that each respectively control which content of personal productivity applications will be accessible under each context profile, selecting a first context profile, from the plurality of context profiles and having a first set of context profile rules, to be operative, applying the first set of context profile rules to control which content of a first personal productivity application is accessible, and applying the first set of context profile rules to control which content of a second personal productivity application is accessible.

DETAILED DESCRIPTION

Figure 1:
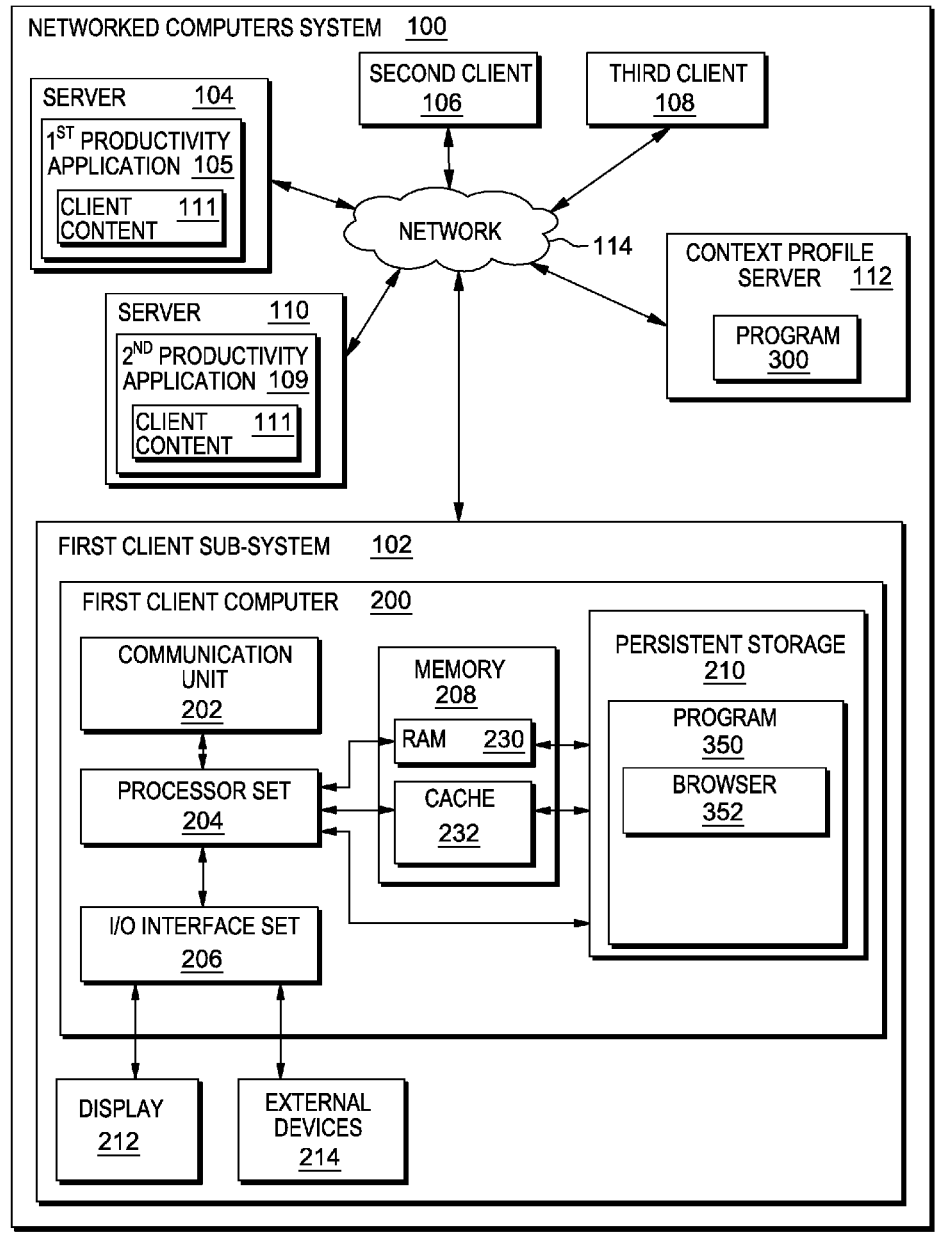
FIG. 1 is a schematic view of a first embodiment of a networked computers system according to the present invention.

This Detailed Description section is divided into the following sub-sections: (i) The Hardware and Software Environment; (ii) Operation of Embodiment(s) of the Present Invention; (iii) Further Comments and/or Embodiments; and (iv) Definitions.

I. the Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of networked computers system 100, including: first client computer sub-system 102; server computer sub-systems 104, 110; second client computer sub-system 106; third client computer sub-system 108; first productivity application 105; first client content module 107; second productivity application 109; second client content module 111; context profile server 112; context profile registry service (CPRS) program 300; communication network 114; first client computer 200; communication unit 202; processor set 204; input/output (i/o) interface set 206; memory device 208; persistent storage device 210; display device 212; external device set 214; random access memory (RAM) devices 230; cache memory device 232; program 350, and browser module 352.

First client computer sub-system 102 is, in many respects, representative of the various computer sub-system(s) in the present invention. Accordingly, several portions of computer sub-system 102 will now be discussed in the following paragraphs.

First client computer sub-system 102 may be a laptop computer, a tablet computer, a netbook computer, a personal computer (PC), a desktop computer, a personal digital assistant (PDA), a smart phone, or any programmable electronic device capable of communicating with the client sub-systems via network 114. Program 350 is a collection of machine-readable instructions and/or data that is used to create, manage and control certain software functions that will be discussed in detail, below, in the Operation Of the Embodiment(s) sub-section of this Detailed Description section. Browser 352 is a conventional networked computers browser for communicating over network 114. The browser can handle conventional personal productivity applications, such as applications 105 and 109.

Client computer sub-system 102 is capable of communicating with other computer sub-systems via network 114. Network 114 can be, for example, a local area network (LAN), a wide area network (WAN), such as the Internet, or a combination of the two, and can include wired, wireless, or fiber optic connections. In general, network 114 can be any combination of connections and protocols that will support communications between server and client sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Client computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 350 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 350 may include both machine-readable and performable instructions and/or substantive data (that is, the type of data stored in a database). In this particular embodiment, persistent storage 210 includes a magnetic hard disk drive. To name some possible variations, persistent storage 210 may include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 106 and 108, and server sub-systems 104 and 110. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with client computer 200. For example, I/O interface set 206 provides a connection to external device set 214. External device set 214 will typically include devices such as a keyboard, a keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 350, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(S) of the Present Invention

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
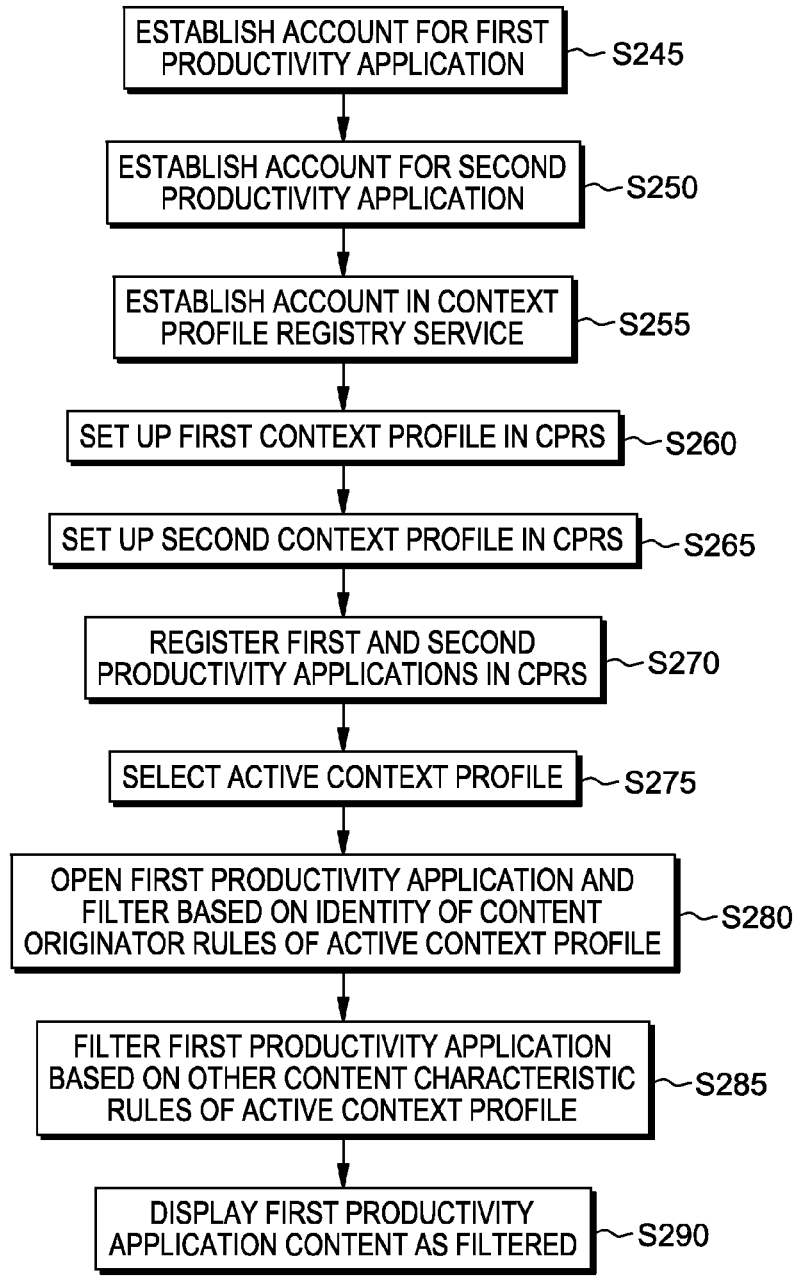
FIG. 2 is a flowchart showing a process performed, at least in part, by the first embodiment networked computers system.
Figure 3:
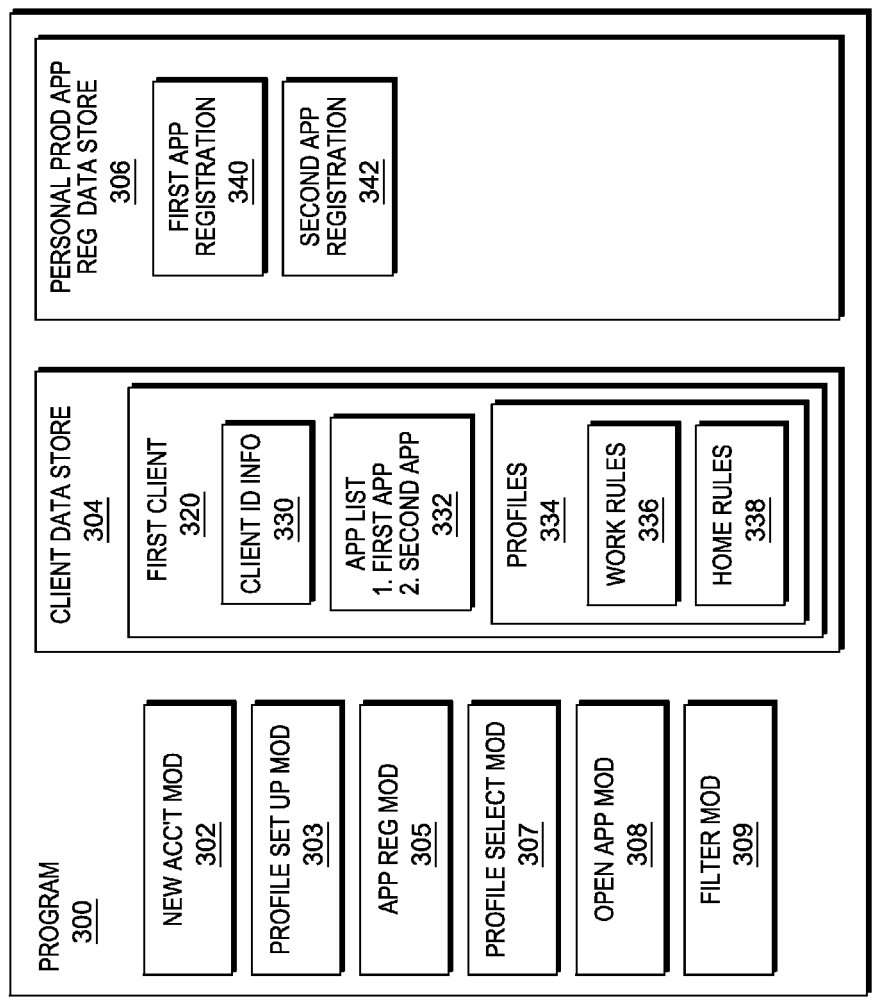
FIG. 3 is a schematic view of a portion of the first embodiment networked computers system.

FIG. 2 shows a flow chart 240 depicting a method according to the present invention. FIG. 3 shows CPRS program 300 for performing at least some of the method steps of flow chart 240. This method and associated software will now be discussed, over the course of the following paragraphs, with extensive reference to FIG. 2 (for the method step blocks) and FIG. 3 (for the software blocks).

Processing begins at step S245, where browser 352 (see FIG. 1) and first productivity application 105 (see FIG. 1), communicating through network 114, work cooperatively to establish an account for first productivity application 105. In this embodiment, the browser and productivity application communicate through a networked computers system. Alternatively, the browser and the first productivity application may be physically located on a single computer such that communication through a network is not necessary. Productivity applications provide a user with productivity support, typically in the area of time management and organization. Generally speaking, productivity applications are the set of applications that one uses on a daily basis to manage time, contacts, and tasks. Examples of productivity applications are: (i) e-mail accounts; (ii) instant messengers; (iii) calendars; (iv) social network accounts; (v) corporate networking communities; (vi) contact organizers; (vii) task lists; and (viii) call history managers. Many productivity applications serve multiple purposes in both business and personal matters. Some productivity applications are dedicated by the user and/or employer for either business or personal activities.

In this embodiment, the first productivity application is the user's Corporation A e-mail account, which the user is privileged to have by virtue of working for Corporation A. While the user mostly handles work matters through this email account, the user also occasionally uses this email address to correspond regarding: (i) matters of personal business (non work-related); (ii) family matters; and (iii) social matters. Some matters are difficult to strictly characterize as work, family, personal business or social. However, some embodiments of the present invention do not attempt to filter content by directly detecting the subject matter of the personal productivity content (for example, by analytics), but, rather filter based upon the identity of the "content originator."

Processing proceeds to step S250, where browser 352 and second productivity application 109 (see FIG. 1), communicating through network 114, work cooperatively to establish an account for second productivity application 109 (see FIG. 1). The second productivity application is not integrated with the first productivity application. Also, the entity that owns and controls and manages the first application 105 does not own, control or manage the second application. Also, as shown in FIG. 1, the first and second applications 105, 109 are respectively hosted on completely different server sub-systems. That is, the two applications are independently administered. Alternatively, the two personal productivity applications could be part of a single suite of applications, managed and controlled by a single entity, and/or administered from a common server set, but, in this embodiment under discussion, that is definitely not the case. Further, the various components and modules shown in FIG. 1 as being located on server 104, server 110, context profile server 112, and first client sub-system 102 may all be located on a single computer such that no communication over a network is necessary.

Oftentimes a user loads multiple independently administered productivity applications on a single device because of: (i) personal preference; (ii) availability of integrated application packages; and/or (iii) third parties directing the use of certain productivity applications. In this embodiment, the second productivity application is the user's personal e-mail account. Alternatively, both the first and second personal productivity applications could be any type of personal productivity application now known or to be developed in the future.

Processing proceeds to step S255, where browser 352 (see FIG. 1) and new account module 302 of program 300 of CPRS server 112 (see FIG. 1), communicating through network 114 (see FIG. 1), work cooperatively to establish a CPRS account. The new account module creates first client module 320 in client data store 304. The user populates, via the browser, client ID information database 330 with data including a username and password. CPRS program 300 provides the user with: (i) a single store for context profiles (see Definitions Section of this Detailed Description for a definition of "context profile"); and (ii) a registry for the various productivity applications.

In this embodiment, the CPRS server, and its service (which will be described below) is provided by an entity which is separate and distinct from all of the following: (i) the user (that is, the user of browser 352); (ii) the controller and manager of the first personal productivity application; and (iii) the controller and manager of the second personal productivity application. In this embodiment, this "separateness" of the entities is advantageous because it does not matter which personal productivity applications a given user uses—the CPRS providing entity, and its CPRS server, can service them all.

Processing proceeds to step S260, where browser 352 (see FIG. 1) and profile set up module 303, communicating through network 114, work cooperatively to set up work rules context profile 336 in profiles database 334. A context profile includes predetermined rules, usually related to the temporal circumstances of the user, such as when the user is at work, in a meeting, or at home. A detailed discussion of various example circumstances is provided below in Section III of this Detailed Description. In this embodiment, the work rules context profile contains a rule that provides the user with e-mails from content originators having the following identities: (i) supervisor A; (ii) associate B; (iii) associate C; (iv) client contact D; and (v) client contact E. Further, the work rules context profile contains a rule that also provides the user with e-mails having the content subject matter of "weekly team meeting."

Processing proceeds to step S265, where browser 352 (see FIG. 1) and profile set up module 303, communicating through network 114, work cooperatively to set up home rules context profile 338 in profiles database 334. As discussed in more detail below, when the user establishes multiple context profiles, the content available in productivity applications is for the needs of a specified context profile based on rules stored as various context profiles. In this embodiment, home rules context profile 338 contains a rule that provides the user with e-mails from content originators having the following identities: (i) spouse F; (ii) friend G; (iii) friend H; and (iv) soccer coach J. Further, the home rules context profile contains a rule that provides the user with e-mails having a content form of "video."

Processing proceeds to step S270, where browser 352 (see FIG. 1) and application registration module 305, communicating through network 114, work cooperatively to register first productivity application 105 and second productivity application 109 (see FIG. 1) by adding the registered applications to registered applications list 332 and storing first application registration data 340 and second application registration data 342 in personal productivity application registration data store 306. Registration of the productivity applications allows CPRS to access the applications and manage the content delivered by each application. A detailed discussion of context profile management is provided, below, in the Further Comments And/or Embodiments sub-section III of this Detailed Discussion.

Processing proceeds to step S275, where browser 352 (see FIG. 1) and profile selection module 307, communicating through network 114, select an active context profile. In this embodiment, a user selects work rules context profile 336 from the context profiles set up in profiles database 334. Alternatively, the selection of the active context profile is made automatically by software based upon "contextual conditions." See the Definitions Section of this Detailed Description for a definition of "contextual conditions."

Processing proceeds to step S280, where browser 352 (see FIG. 1) and open application module 308, communicating through network 114, recognize that first productivity application 105, a registered application, is open. The open application module 308 communicates the open condition of the registered application to filter module 309. The filter mod filters client contents 107 (see FIG. 1) in the first productivity application according to the content originator rules of the active context profile. In this embodiment, work rules context profile 336 is the active profile. Accordingly, the client content is filtered for content originators having one of the following identities: (i) supervisor A; (ii) associate B; (iii) associate C; (iv) client contact D; and (v) client contact E.

When second productivity application 109 (see FIG. 1) is opened, filter module 309 filters client content 111 (see FIG. 1) in the second productivity application according to the work rules context profile 336. In this embodiment the work rules include content originator rules, whereby content only by certain authors will be accessible to the user on the user's device (which is presumably being used at work). Of course, in this example, the content originators designated for access will probably include the user's co-workers, and may even be limited to the user's co-workers and other business-related correspondents. In this embodiment, the work rules context profile also includes other rules, such as geographic rules and time-based rules.

In this embodiment, the CPRS machine is the actual computer that filters the content. In other words, each piece of content is communicated: (i) from the application server, through the network, to and through the CPRS machine and its filter mod 309, and then, through the network again to the end user's device; or, alternatively, (ii) from the application server, through the network and to the CPRS machine where it is stopped by the filter mod according to the content originator and/or other applicable rules. Alternatively, in other embodiments: (i) the filtering may be performed at the application server, before a given piece of content has been communicated over the network so that only some pieces of content are communicated from the application server, directly through the network, to the user's device; or (ii) the filtering may be performed at the user's device after the various pieces of content have been sent from the application server, through the network, to the user device.

Processing proceeds to step S285, where filter module 309 accesses client content 107 (see FIG. 1) in first productivity application 105 through network 114 (see FIG. 1) to filter the client content to be displayed through browser 352 via display 212 (see FIG. 1) according to the current context profile rules associated with characteristics other than content originator. In this embodiment, when work rules context profile 336 is active, the client content for open, registered productivity applications is filtered based upon subject matter. For example, if the subject matter of a piece of content is "weekly team meeting," then this content may be made to be accessible to the user, even if the piece of "weekly team meeting" content was not originated by one of the approved content originators.

Processing proceeds to step S290, where browser 352 displays via display 212 (see FIG. 1) the filtered content for open productivity applications that are registered with the CPRS program. In this embodiment, browser 352 displays e-mails in Corporation A e-mail account, where the content originators have one of the following identities: (i) supervisor A; (ii) associate B; (iii) associate C; (iv) client contact D; and (v) client contact E. Additionally, browser 352 displays e-mail in Corporation A e-mail account for all e-mail that includes the content subject matter of "weekly team meeting." The display function applies to incoming client content as well as client content stored in the application database. In this embodiment, a new e-mail from associate B will be displayed so long as work rules context profile 336 is the active profile.

When second productivity application 109 (see FIG. 1) is opened, browser 352 displays via display 212 any e-mails in the personal e-mail account that meet the context rules of the work rules context profile, which is the active profile.

III. Further Comments and/or Embodiments

Some embodiments of the present disclosure recognize that the ability to use multiple personal productivity applications on a single device tends to impede the effectiveness of the user because she has to navigate several applications and corresponding data to locate material relevant to her current situation, whether at home or at work or even managing a particular project. There is no fine-grained control over application content or functions on a user's personal device. These devices do not understand the user's context(s) such that the user is allowed to selectively receive content that is relevant to a particular user context. There is a need for users to selectively lock certain pieces of application functions and data, but there is no such mechanism to achieve this today.

Generally speaking, personal productivity applications are the set of applications that one uses on a daily basis to manage one's day-to-day tasks, such as an email application, chat application, calendar application, and contacts application, which is primarily used for communication within the context of sender and receiver. In some embodiments of the present invention, a word processor application is not considered a personal productivity application because a word processor is content focused, rather than interaction focused.

Consider, for example, the case of a BYOD (Bring Your Own Device) policy. Under a BYOD policy, a personal device is used for both personal and office use. When performing an important task at the office, the user may want to suppress content relevant only in a personal context. For another example, an employee who is dealing with a critical project situation at the office would want his personal device to alert him of only things that relate to the critical situation at hand. She would prefer to suppress content related to non-critical, business-as-usual events. For yet another example, an employee who wants to temporarily hand over his device to another colleague will want to allow access only to content related to the context of an employee's clearance level with the employer, while preventing access to personal and/or employer confidential content on that device.

Some embodiments of the present disclosure provide capabilities to the user of a personal device including: (i) classification of the user's content in personal productivity applications; (ii) filtering contents based on the user context; (iii) a method to specify a device usage context using the notion of a "usage context profile" (referred to herein as "profile"); (iv) a method to classify content based on various attributes within each productivity application and to associate this classification of content to a profile; (v) a method to manage the life cycle of profiles (create, delete, activate, deactivate, etc). Some embodiments of the present disclosure define "content" as any user data available via a personal productivity application on a personal device. Some embodiments include advertisement as a form of content.

Some embodiments of the present disclosure provide a mechanism to centrally specify a user context, or usage context, to the device. When specified, the context information percolates to a multitude of personal productivity applications that, in turn, react to the new usage context by selectively allowing or denying access to the available content.

The content classification and filtering mechanisms employed by some embodiments of the present disclosure are based on the premise that content accessed via personal productivity applications can be associated with one or more personal identities, or contexts, that are closely associated to that content. Examples of associating content to one or more usage contexts include: (i) an email related to a sender and a set of recipients; (ii) an instant messenger conversation related to one or more persons taking part in a chat session; and (iii) a calendar invite related to a set of participants invited to a particular meeting.

Some embodiments of the present disclosure are used in a process having several steps. Each step will now be discussed in detail. The user creates one or more profiles. The defined profile(s) are centrally managed by a profile manager. For example, a user creates four distinct profiles: (i) BigClientCRISIS; (ii) DisablePersonalData; (iii) BusinessMeeting; and (iv) PersonalStuff. The user defines the characteristics of each profile using the profile manager. Examples of profile-specific characteristics include: (i) in the profile "BigClientCRISIS," show content only from BigClient project team; (ii) in the profile "DisablePersonalData," do not show content from Payroll, Banks, and personal contacts; (iii) in the profile "BusinessMeeting," allow communications from project team and manager, but deny communication from personal contacts; and (iv) in the profile "PersonalStuff," only allow communications from personal contacts.

Having established profiles and corresponding rules, the user activates a profile via the central profile manager. For example, the user may activate the profile "BigClientCRISIS." The profile manager communicates the profile activation to all the participating applications. For example, the profile manager may communicate to the user's email and calendar applications that communication to the IM application is being denied, therefore, there is to be no communication from the profile manager to the IM application. Each application reacts to the newly activated profile by taking actions including: (i) the application obtains the profile details from the profile manager; (ii) the application applies appropriate filtering rules at the application level; and (iii) the application refreshes its user interface contents to suit the selected user context. For example, the email application obtains filtering criteria associated with the profile "BigClientCRISIS" and retrieves the email IDs for the set of people that belong to the BigClient project, as specified in the profile. The email application then executes the filtering rule to show emails from the identified email IDs, while filtering out any other emails. The email application refreshes the displayed email folder to show only email relevant to the designated "BigClientCRISIS" profile. Similarly, the calendar application highlights the meetings that involve the specified BigClient project team listed in the profile definition.

When the user starts a new productivity application, the application obtains the profile that is currently active. If no profile is active, or the profile manager is not available, the application does not apply any filtering rules. If a profile is active, the application takes steps including: (i) obtaining the profile details from the profile manager; (ii) applying appropriate filtering rules at the application level; and (iii) refreshing its user interface contents to suit the user context. For example, when the user starts the IM application, the application gets information on the active profile, then retrieves the contact IDs for the set of people that belong to the BigClient project, as specified in that profile, then the application executes the filtering rule to show contacts and chat windows from the identified email IDs, while hiding chat windows and contact names from non-members of the group. When an application receives an update to the base content (its underlying data), the application uses the existing filtering rule to refresh the newly available content. For example, while the active profile is "BigClientCRISIS," a new email arrives, but the email client displays the message only when the filtering rules permit its display (that is, if the email sender belongs to the relevant project group specified in the profile, the email is shown on the user interface along with any appropriate user notification, or if the email sender does not belong to the relevant project group, or allowed group, the email is neither shown on the user interface nor any notification of the new email is shown to the user. For a further example, a new chat invitation arrives, but the instant messenger application shows the chat invitation only when the filtering criteria is met.

When the user wants to switch to a different context, she simply switches to another profile. Situations where context change may be required include: (i) the user has to deal with a critical work situation and does not want to be disturbed; (ii) the user needs to display her screen to others to present a document in a client meeting and does not want to expose sensitive personal and/or office confidential information by accident; and (iii) the user leaves an important meeting and returns to his normal work mode.

An example of changing context using profiles is where the user activates her PersonalStuff profile, which implicitly deactivates her BigClientCRISIS profile, which was active. Due to the profile change, the profile manager communicates the new profile activation to all of the participating applications and each application reacts by: (i) obtaining the new filtering rules; and (ii) refreshing the user interface contents according to the rules of the new profile. Continuing with the above example, when the profile manager communicates to the email application that the PersonalStuff profile is activated, the email application obtains filtering criteria associated with the PersonalStuff profile, retrieves the email IDs of the set of people that belong to the PersonalStuff profile, and executes the filtering rule to show emails from the identified email IDs, while filtering out any other emails. Once the new filtering rule is executed, the email application refreshes the displayed email folder to show only the emails that meet the filtering rules for the active profile. Similary, a calendar application would highlight appropriate meetings and contacts that meet the filtering rules of the PersonalStuff profile.

When the user deactivates the active profile in the central profile manager or completely disables the central profile manager, all applications revert to their original state where no profile-specified filtering rules are applied. In order for the applications to revert to their original state, the profile manager communicates the profile deactivation (or profile manager shutdown) to all the participating applications. Upon receipt of the communication, all associated applications discard the current filtering rules and all associated applications refresh their user interface contents to reflect no filtering rules. For example, the user deactivates the PersonalStuff profile and does not activate any other profile, so the profile manager communicates to the email application about the deactivation of the PersonalStuff profile and that there is no active profile at that point. Accordingly, the email application removes the filtering criteria to display all emails. Similarly, the calendar application would refresh the application view to display all available meetings, and the IM application would refresh the application view to display all messenger contacts and chat sessions.

Some embodiments of the present disclosure provide systems and methods for: (i) centrally defining content classification rules for application content filtering for personal productivity applications; (ii) specifying application content filtering rules based on content source (examples include: content originator and recipient); (iii) linking content classification rules to individual applications (via the notion of a usage context profile); (iv) specifying the usage context at a central level (via the notion of a usage context profile) and changing the classification across multiple personal productivity applications on the personal device.

Some embodiments of the present disclosure let device users: (i) specify the usage context of the device; and (ii) control content by application made available to each profile. Thus, the user is able to maintain the desired privacy and/or security as well as improve productivity through enhanced usability.

The implementation of some embodiments of the present disclosure is described using a three-level, or three-layer, system architecture. This three-level architecture is similar to the Android mobile architecture. (Note: the term "Android" may be subject to trademark rights in various jurisdictions throughout the world and are used here only in reference to the products or services properly denominated by the marks to the extent that such trademark rights may exist.)

FIGS. 4, 5, 10 and 12 show various portions of system 400 according to the present disclosure. System 400 includes: application layer 410; application framework layer 430; operating system layer 450; profiles application 412; profile manager 432; social media site A; social media site B; social media site C; social media site D; SMS (short message service) 422; email client 424; contact directory 426; calendar application 428; application manager 434; resource manager 436; activity manager 438; content manager 440; contacts manager 442; state manager 444; registration and de-registration communications 502; publish profile changes communications 504; profiles databases 1012, 1012a, 1012b; contact list 1020; contact details database 1022; and application properties database 1016.

Figure 4:
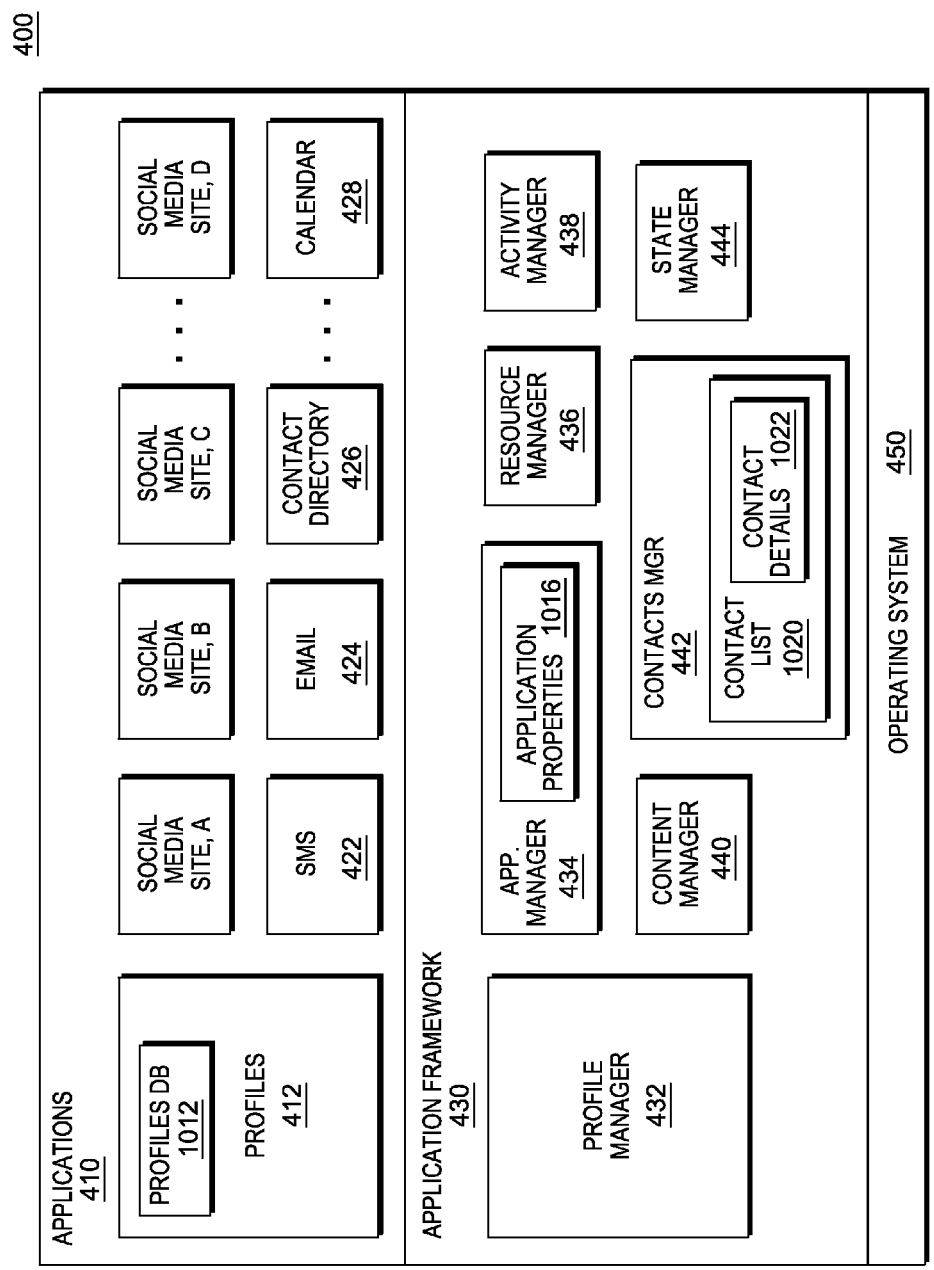
FIG. 4 is a schematic view of a portion of a second embodiment of a system according to the present disclosure.

FIG. 4 is a schematic view of three architectural layers of a system 400 according to an embodiment of the present disclosure. System 400 includes three layers: application layer 410; application framework layer 430; and operating system layer 450. The proposed system can be equally well applied to any other mobile and personal device architectures, as well as non-mobile environments like desktop computers. Architecture 400 includes two components for device content management: profiles application 412; and profile manager 432.

Profile application component 412 resides in applications layer 410 and includes personal productivity applications, such as: social media site A; social media site B; social media site C; social media site D; SMS (short message service) 422; email client 424; contact directory 426; and calendar application 428. The profile application component provides the user with an interface to create and manage the life cycle of profiles.

Profile manager component 432 resides in application framework layer 430. The profile manager component resides in the application framework layer and includes: application manager 434; resource manager 436; activity manager 438; content manager 440; contacts manager 442; and state manager 444. The profile manager component manages the profile life cycle including: (i) profile data; and (ii) activation states. The profile manager also provides application programming interfaces (APIs) and communication mechanisms for integration with productivity applications that need to participate in usage context switching. The profile manager provides the following functions: (i) data structure for profiles; (ii) mechanisms to support the profile application for management of the state and life cycle of profiles; (iii) mechanisms to expose an API for applications to communicate with the profile manager; and (iv) mechanisms to communicate with participating applications.

Some embodiments of the present disclosure have a profile data structure that can be visualized as follows: (i) name of the profile; (ii) current state (active/non-active); (iii) filtering rules (for each contact available in the system, the profile has an indication of whether or not to allow content from the contact); and (iv) list of applications that are to be impacted by this profile.

Some embodiments of the present disclosure include a profile manager having a central application data structure as follows: (i) name of the application; (ii) participation status (does the application participate in usage context switching); and (iii) key identifier (a contact may have many attributes, so this field denotes which attribute is used to filter content). Examples of attributes are: (i) an email ID is the attribute used by an email application to perform filtering; and (ii) a cell phone number is the attribute used by an SMS application to perform filtering.

Figure 5:
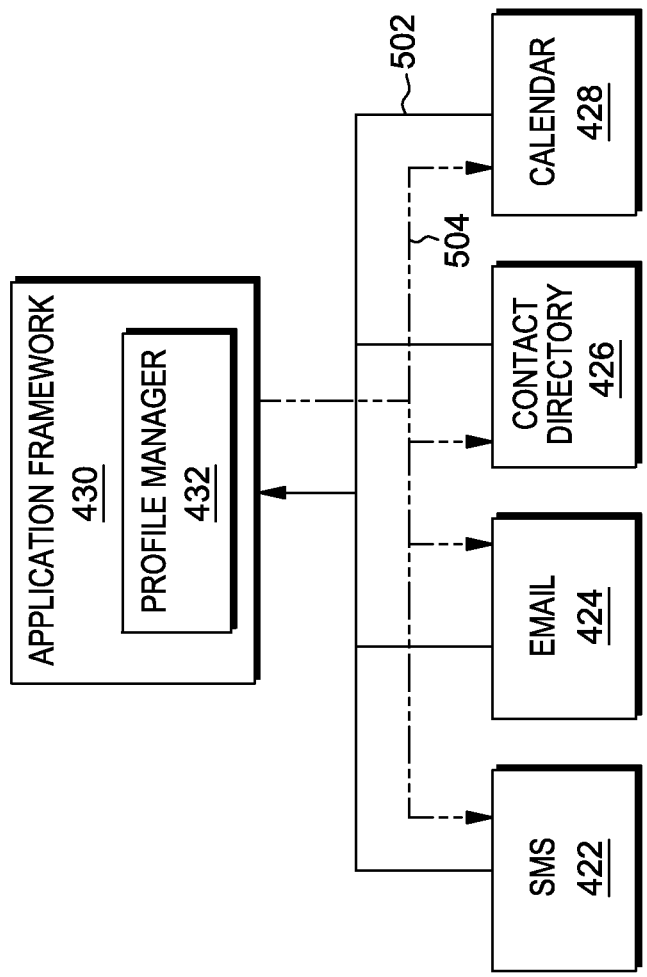
FIG. 5 is a schematic view of a portion of the second embodiment system.

FIG. 5 is a block diagram depicting two-way communication between the applications and the profile management system according to an embodiment of the present disclosure. Two-way communications include: registration and de-registration communications 502; and publish profile changes communications 504.

As shown in FIG. 5, profile manager 432 asynchronously notifies each registered application 422, 424, 426, and 428 with information about a profile activation or deactivation. No communication from the profile manager to the registered application occurs when new profiles are created, updated, and/or deleted, unless the affected profile is currently active.

Some embodiments of the present disclosure communicate the following: (i) information during profile activation including a pointer to the name or ID of the active profile; (ii) profile details such as filtering rules during activation; and/or (iii) invocation of the profile manager APIs to obtain the profile details. Once an application has the profile details, the application has internal capabilities to apply the filtering rules and refresh the application content.

In some embodiments of the present disclosure, the profile application is a user front end for accessing the profile lifecycle API of the profile manager.

It should be noted that the application manager and contacts manager are discussed herein by example only, these are existing services provided by the device operating system. Some embodiments of the present invention provide a profile application having the capability to get a list of applications from the application manager and contacts from the contacts manager.

Figure 6:
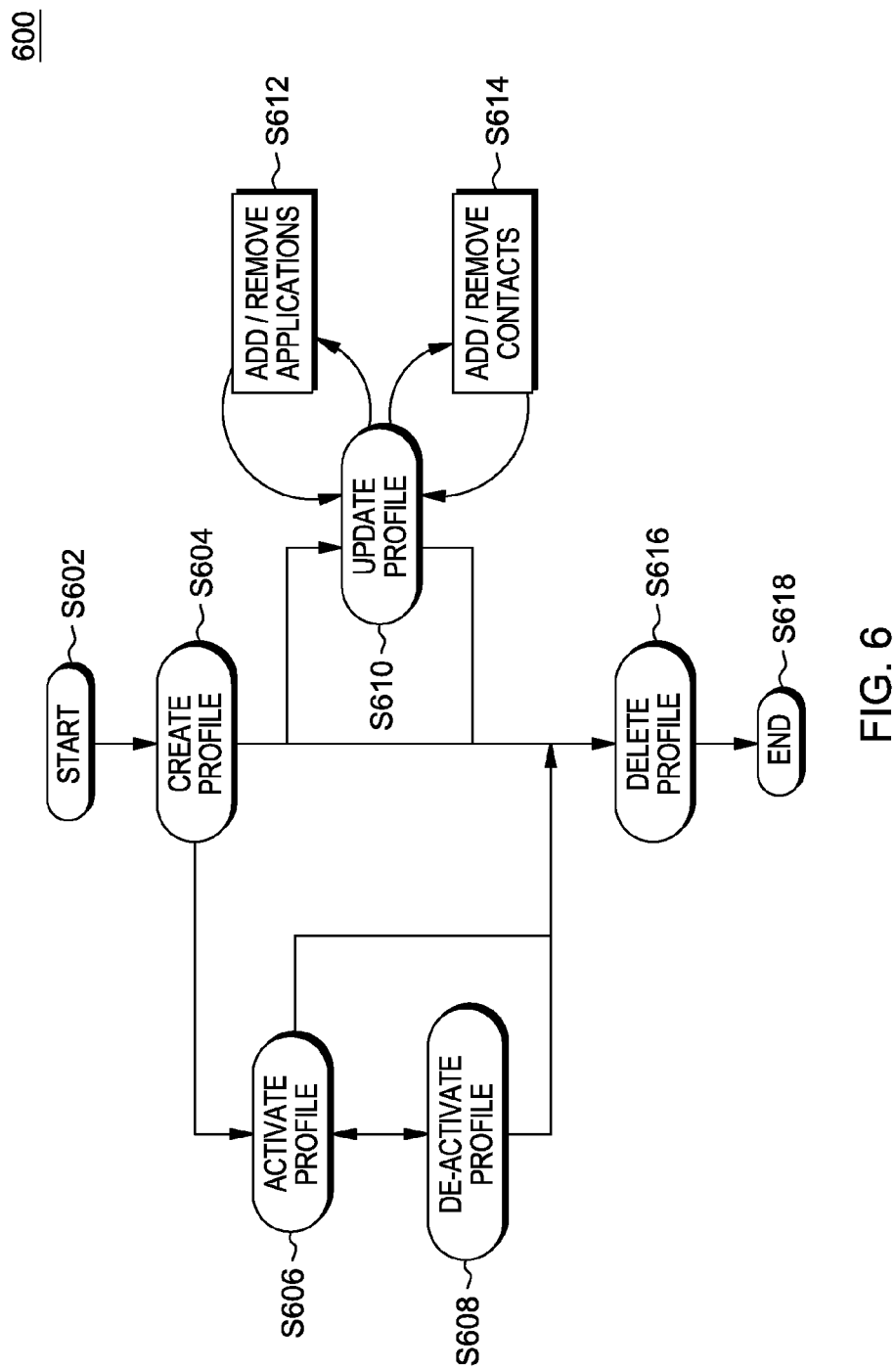
FIG. 6 is a flowchart showing a process performed, at least in part, by the second embodiment system.

FIG. 6 is a flowchart showing process 600 that includes the life cycle states of each profile as supported by the profile manager from start S602 to end S618, according to an embodiment of the present disclosure. Mechanisms for managing profile state(s) and profile life cycle(s) by exposing an API for applications to communicate with the profile manager in support of the profiles application are presented. The user initiates these supporting actions from the profile application. Some embodiments of the present disclosure provide profile manager support for certain APIs to be used by the profile application, including: (i) create profile; (ii) delete profile; (iii) update profile; (iv) activate profile; and (v) deactivate profile.

Process 600 begins at step S602 and proceeds to step S604, where profiles application 412 creates a profile in profiles database 1012. The API "create profile" allows the device user to: (a) create a profile manually; and (b) assign a meaningful name to the profile.

Process 600 includes two paths that may follow step S604, where a profile is created. The lifecycle of a profile oftentimes includes updating the profile as well as activation of the profile. The process associated with updating the profile follows.

Processing proceeds to step S610, where profiles application 412 updates a profile. The API "update profile" allows the user to specify detailed profile attributes including: (i) association with certain contacts; and/or (ii) association with certain applications. The "update profile" API allows contacts to be linked to a profile for inclusion (show content) or exclusion (hide content). A contact may be linked to multiple profiles. The "update profile" API allows the user to specify which applications are linked to a particular profile. One or more applications can be linked to a profile. The "update profile" API allows de-linking of applications and contacts currently linked to the profile.

Processing proceeds to step S612, where profiles application 412 adds and/or removes applications linked to a particular profile. In some embodiments of the present disclosure, the profile manager communicates asynchronously with the participating applications. Participating applications register for a call back upon startup using the profile manager APIs. Further, participating applications will de-register during an application shutdown. As a clean-up mechanism, the profile manager will automatically remove an application registration: (i) if an application is unavailable; or (ii) when the profile manager is unable to communicate with an application.

Processing proceeds to step S614, where profiles application 412 adds and/or removes contacts linked to a particular profile. Some embodiments of the present invention expose the following functions to a user: (i) create and delete operations for profiles; (ii) update profile including: (a) associate contacts and rules to a profile, and (b) associate relevant applications to a profile; (iii) activate and deactivate operations on existing profiles; and (iv) map application ID associations. Some embodiments of the present disclosure provide for functions (i) and (iii) to be directly accomplished by making an invocation to the profile manager. These APIs are based on a request-response model.

The process associated with activation of the profile follows.

Processing proceeds from step S604 to S606, where profiles application 412 activates a profile. The API "activate profile" allows a user to set a profile as the active profile, thus setting the user's context. If another profile were active at the time of invocation, the previously active profile will be deactivated automatically.

Processing proceeds to step S608, where profiles application 412 deactivates a profile. The API "deactivate profile" allows a user to set the currently active profile as inactive, thus changing the user's context. For example, when an active profile is deactivated, the default profile will be activated. Oftentimes, the default profile is the general user's profile where all data in each application is available to the user.

Processing proceeds to step S616, where profiles application 412 deletes a profile in profiles database 1012. The API "delete profile" allows the user to remove any existing profiles.

Some embodiments of the present disclosure implement the following APIs through the profile manager to enable two-way communication with applications: (i) register application; (ii) de-register application; (iii) get current active profile; and (iv) get details of active profile.

The API "register application" is invoked by an application, typically during application startup. The application sends a handle to a callback routine for asynchronous communication from the profile manager to the application. Once registered, the application receives notification events from the manager about any changes to the active profile.

The API "de-register application" is typically implemented when an application is shutdown or otherwise stopped. When an application is de-registered, no further notifications about profile state changes are sent to the application.

The API "get current active profile" retrieves the name of the active profile. Typically, an application will invoke this API soon after registration. Some embodiments of the present disclosure may include full details of the profile as received from the profile manager. Other embodiments of the present disclosure may not include full details of the profile. Both of the above-mentioned embodiments are valid implementation choices.

The API "get details of active profile" retrieves detailed information about the active profile. This includes information about filtering rules, etc. The retrieved information provides sufficient details for the application to react to the corresponding context requirements, such as filtering out a set of email IDs.

Figure 7:
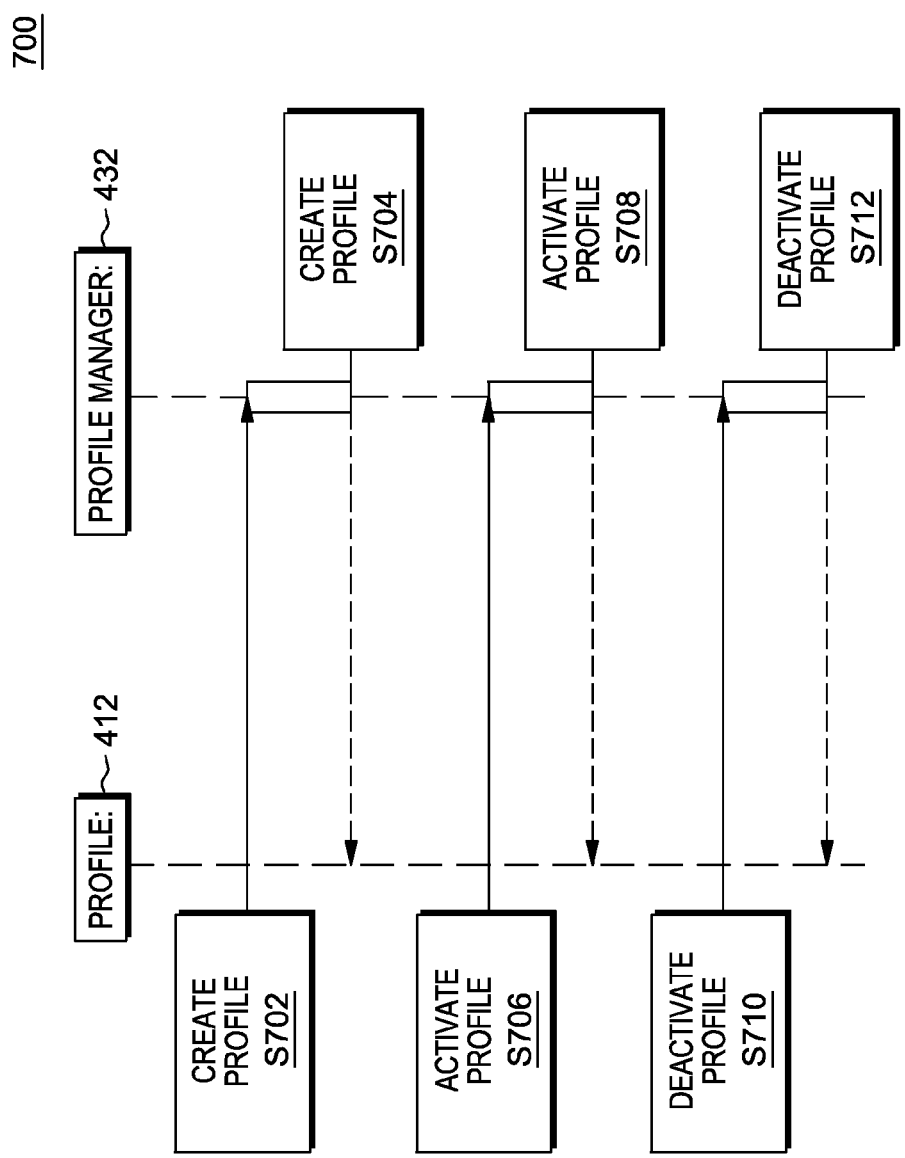
FIG. 7 is a flowchart showing a process performed, at least in part, by the second embodiment system.

FIG. 7 is a flowchart for process 700 according to an embodiment of the present disclosure having profile interaction sequences including the functions: (i) create; (ii) activate; and (iii) deactivate.

Process 700 begins with step S702, where profile application 412 requests that profile manager 432 create a profile. This is the first step in a request-response sequence initiated by profile application 412 to profile manager 432 to create a profile.

Processing proceeds to step S704, where the profile manager notifies the profile application that a profile has been created.

Processing proceeds to step S706, where profile application 412 requests that profile manager 432 activate a profile. This is the first step in a request-response sequence initiated by the profile application to activate a profile.

Processing proceeds to step S708, where the profile manager notifies the profile application that a profile has been activated.

Processing proceeds to step S710, where profile application 412 requests that profile manager 432 deactivate a profile. This is the first step in a request-response sequence initiated by the profile application to deactivate a profile.

Processing proceeds to step S712, where the profile manager notifies the profile application that a profile has been deactivated.

Figure 8:
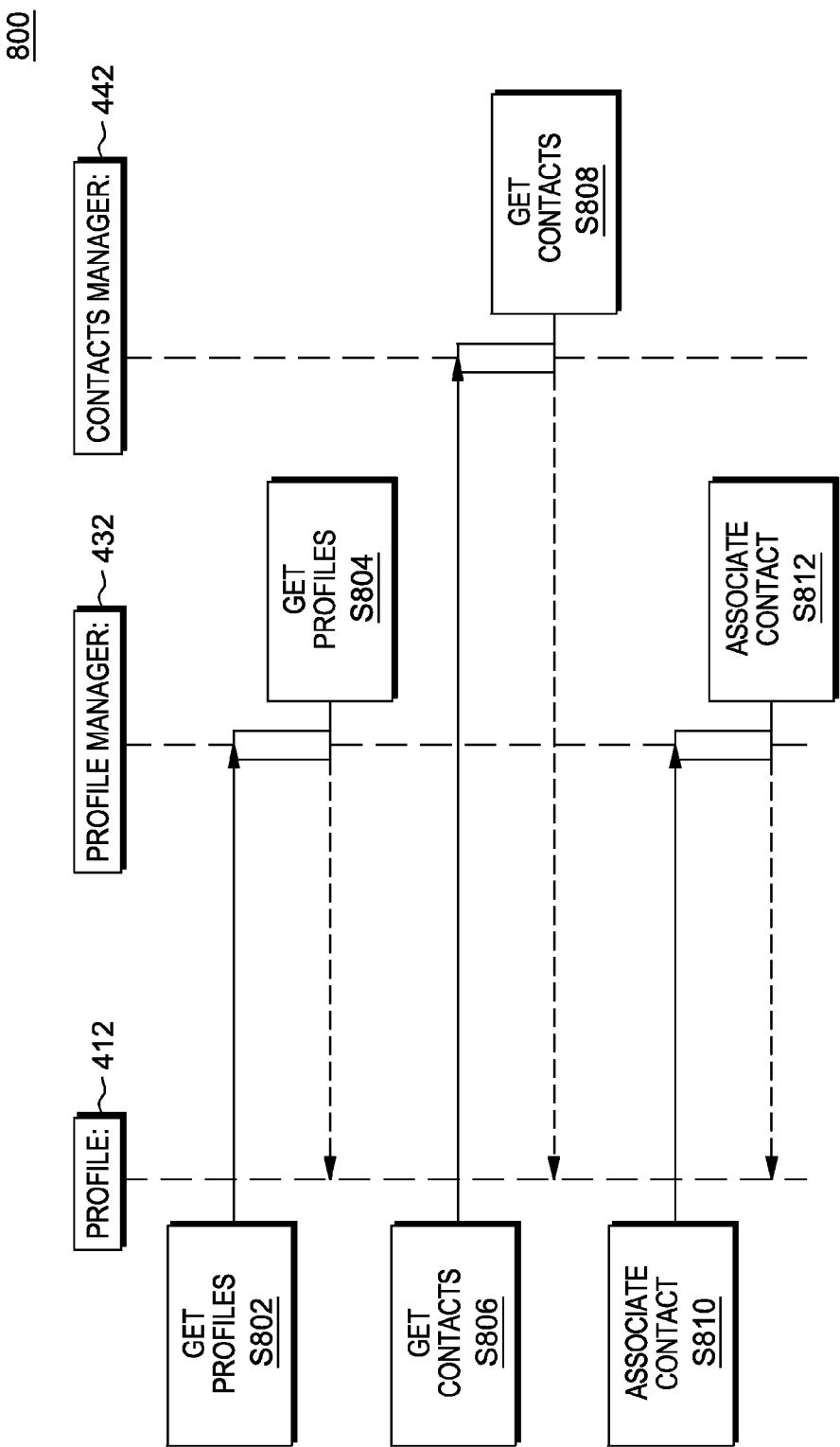
FIG. 8 is a flowchart showing a process performed, at least in part, by the second embodiment system.

FIG. 8 is a flowchart for process 800 according to an embodiment of the present disclosure having profile interaction sequences including the function of associating contacts and rules to a given profile according to an embodiment of the present disclosure. Profile application 412 allows the user to manually associate profiles created in the system with contacts in the system. In some embodiments of the present disclosure, the profile application invokes the profile update API to pass the information collected from the user to profile manager 432.

Process 800 begins with step S802, where profile application 412 requests a list of all profiles from profile manager 432. This is the first step in a request-response sequence initiated by the profile application to get all profiles.

Processing proceeds to step S804, where the profile manager provides the profile application with a list of all profiles.

Processing proceeds to step S806, where profile application 412 requests a list of all contacts from contacts manager 442. This is the first step in a request-response sequence initiated by the profile application to get all contacts.

Processing proceeds to step S808, where the contacts manager provides the profile application with a list of all contacts. At this point, the profile application has all information available for allowing the user to map contacts to the profiles. In some embodiments of the present disclosure, the profile application pre-loads existing associations between contacts and profiles. The user maps the contacts to the profile using the profile application.

Processing proceeds to step S810, where profile application 412 requests that profile manager 432 associate a contact to a profile. This is the first step in a request-response sequence initiated by the profile application to associate a contact to a profile.

Processing proceeds to step S812, where the profile manager notifies the profile application that a contact is associated with a profile, as requested.

Some embodiments of the present disclosure include request-response sequences: (i) to get a list of all profiles; (ii) to activate a profile; and (iii) to deactivate a profile.

Some embodiments of the present disclosure provide for a user to limit the impact of a profile to a limited set of applications instead of the more likely scenario where profiles will affect all registered applications in the system. For example, the user may want to: (i) prevent viewing of instant messenger updates sent by his colleagues while in the BusinessMeeting profile; and (ii) receive emails sent by his colleagues on his email client while in the BusinessMeeting profile.

Where selected applications will be affected by a given profile, the profiles application obtains: (i) a list of applications from the application manager; and (ii) a list of profiles created in the system. The profile application allows the user to manually associate the profiles with the applications in the system. Further, the profile application invokes the profile update API to pass the information collected from the user to the profile manager.

Figure 9:
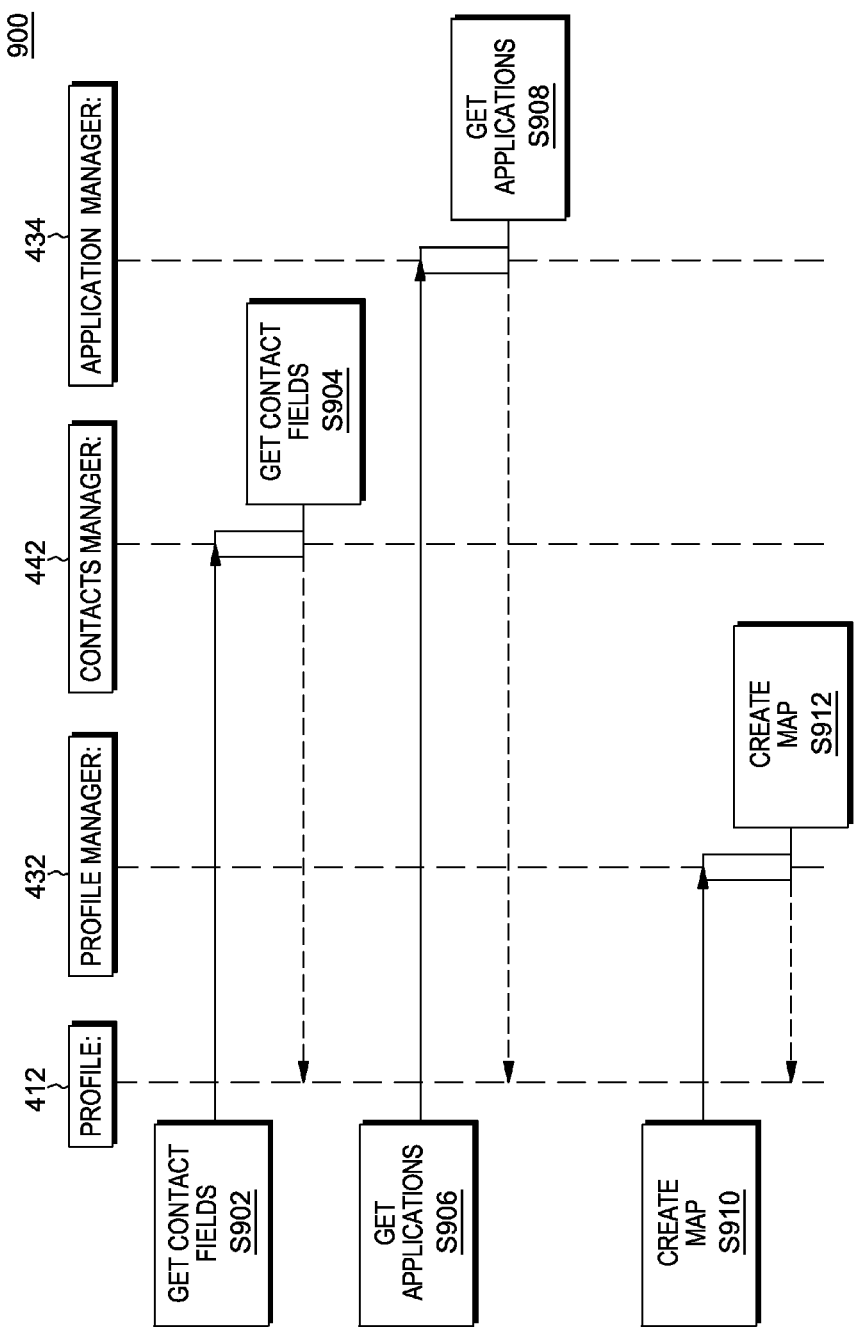
FIG. 9 is a flowchart showing a process performed, at least in part, by the second embodiment system.

FIG. 9 is a flowchart for process 900 according to an embodiment of the present disclosure having profile interaction sequences to map application ID associations. Profile application 412 obtains a list of applications from application manager 432 and contact attribute definitions from contact manager 442. The profile application allows the user to manually associate one or more contact attribute fields to be mapped to each application in the system. Further, the profile application invokes the profile update API to specify the key identifier for each application.

Process 900 begins with step S902, where profile application 412 requests the data structure associated with the contacts definition from contact manager 442. For example, the response may state that a contact has the fields called name, phone number and email ID. In some embodiments, the user identifies the field in contacts details 1022 that can act as the primary key in the application to identify the source. This is the first step in a request-response sequence initiated by the profile application to get the data structure associated with the contacts definition from contacts manager 442.

Processing proceeds to step S904, where the contacts manager provides the profile application with the data structure associated with the contacts definition.

Processing proceeds to step S906, where profile application 412 requests that application manager 434 provide data stored in application properties database 1016. This is the first step in a request-response sequence initiated by the profile application to get data stored in the application properties database from the application manager.

Processing proceeds to step S908, where the application manager provides the profile application with data stored in the application properties database. Steps S902 through S908 provide profile application 412 with all the information available to allow the user to view the relevant contacts attribute for each application. The profile application may pre-load existing mapping information available in the system.

Processing proceeds to step S910, where profile application 412 requests profile manager 432 to create a map including: (i) application ID; and (ii) primary key field ID. This is the first step in a request-response sequence initiated by the profile application and made to the profile manager to update the application-to-contact attribute mapping.

Processing proceeds to step S912, where profile manager 432 updates the application-to-contact attribute mapping as requested by the profile application.

Some embodiments of the present disclosure provide a user interface for selecting an application and an appropriate contact attribute to perform the mapping using the profile application. In an alternative scenario, multiple contact attributes may be linked to a single application. For example, map home phone number and mobile number to SMS application. Alternatively, the map is created at the system level for known applications.

Figure 10:
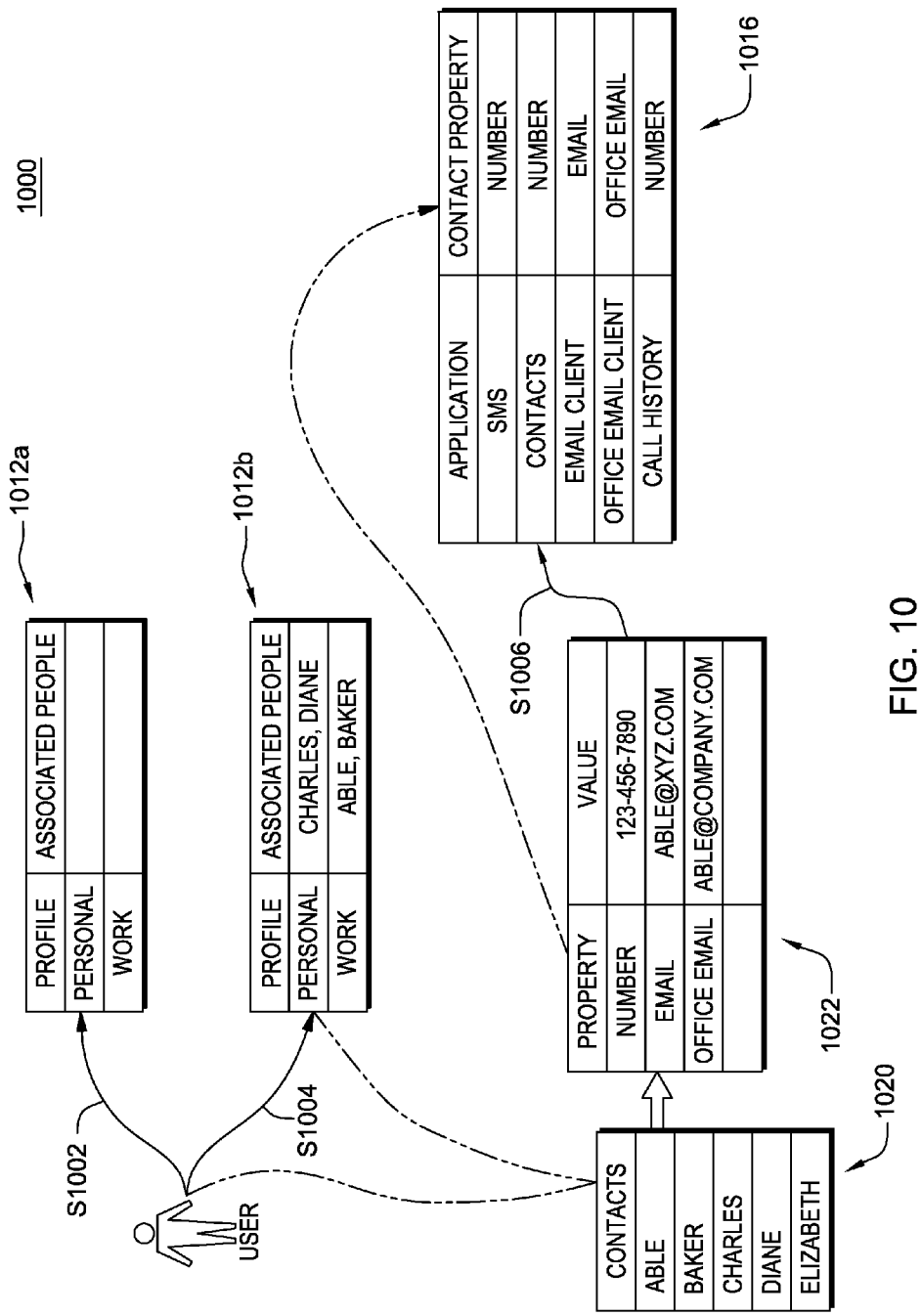
FIG. 10 is a flowchart showing a process performed, at least in part, by the second embodiment system.

FIG. 10 is a flow chart depicting profile management process 1000 according to an embodiment of the present disclosure.

Processing begins at step S1002 where the user creates two profiles, personal and work, in profiles database 1012a using profile application 412 as described in function (i), above.

Processing proceeds to step S1004 where the user associates contacts to the two profiles as described in function (ii)(a), above. As shown in profiles database 1012b, the user adds the contacts "Charles" and "Diane" to the profile "personal." Further, user adds the contact "Able" and "Baker" to the profile "work."

Processing proceeds to step S1006 where the primary contact identifier is mapped to each application as described in function (iv), above. Mapping is performed with reference to contact list 1020 and contact details 1022 associated with each contact in contacts manager 442. In some embodiments, the user assigns a contact property in application properties database 1016 for each application to uniquely identify the corresponding content. It should be noted that step S1006 is performed only once as it is not required for every contact level.

Figure 11:
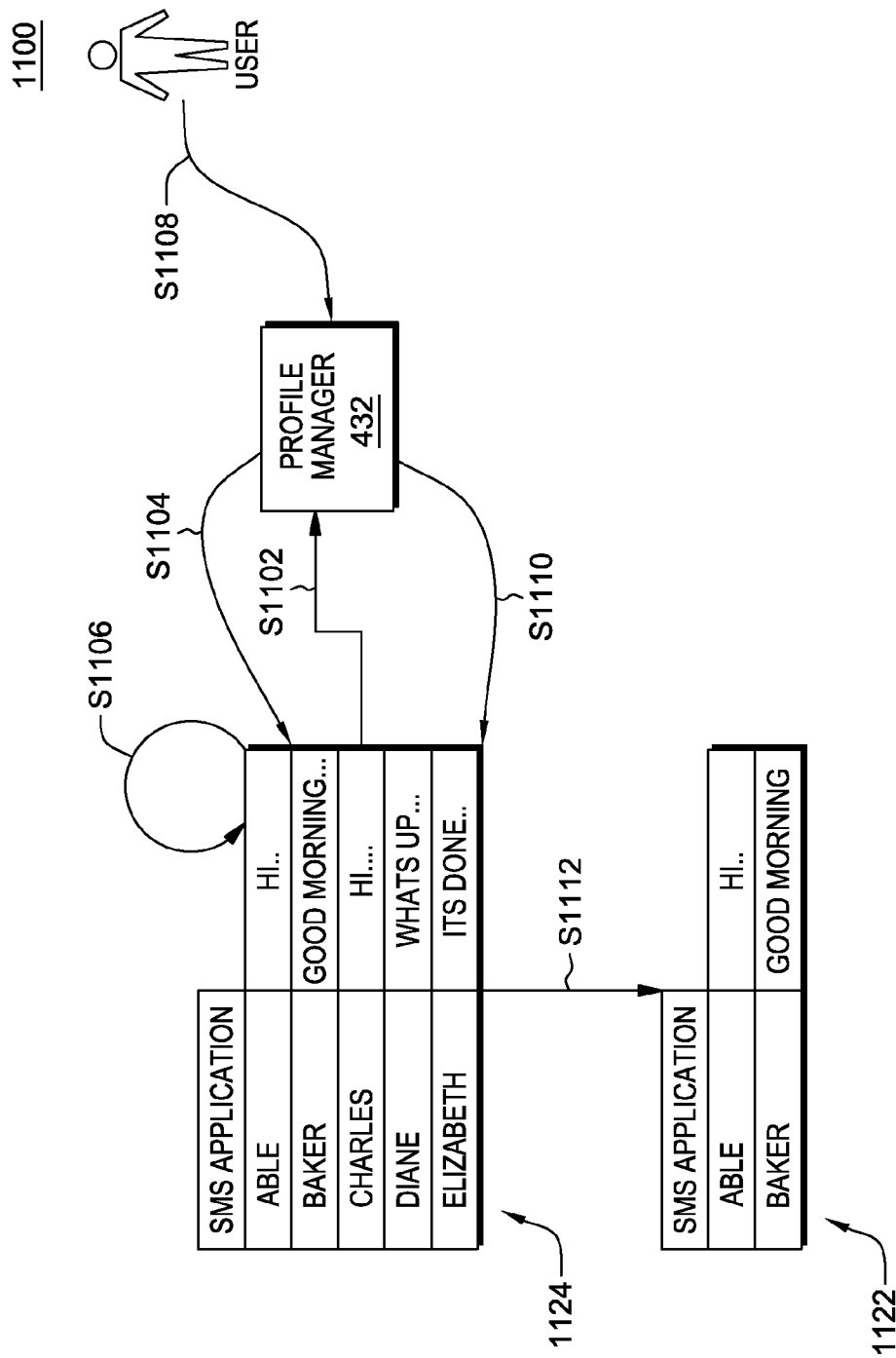
FIG. 11 is a flowchart showing a process performed, at least in part, by the second embodiment system.

FIG. 11 is a flow chart depicting process 1100 that illustrates the capability and implementation of profile functionality from an SMS application perspective.

Processing begins at step S1102, where the application registers itself with the profile manager upon startup of the application. If a profile manager is not present, the application will not apply any content filtering rules.

Processing proceeds to step S1104, where the application uses the profile manager APIs to retrieve the current profile and associated characteristics of that profile.

Processing proceeds to step S1106, where any filtering rules associated with the current profile are applied while preparing the content to be displayed on the user interface. In the illustrated example, the general profile obtained from the profile manager has no filtering rules, so screenshot 1124 displays all SMS messages from the server.

Processing proceeds to step S1108, where the user switches to another profile called "work."

Processing proceeds to step S1110, where the profile manager notifies all registered applications about the profile change. SMS application 422 gets this notification as well. Alternatively, the details are obtained from the profile manager via the exposed profile manager APIs.

Processing proceeds to step S1112, where the application reacts to the profile change by refreshing the user interface. During the refresh, the filtering rules associated with the current profile "work" are applied. In the illustrated example, the profile "work" obtained from the profile manager only allows SMS messages from Able and Baker to be shown in screenshot 1122.

Figure 12:
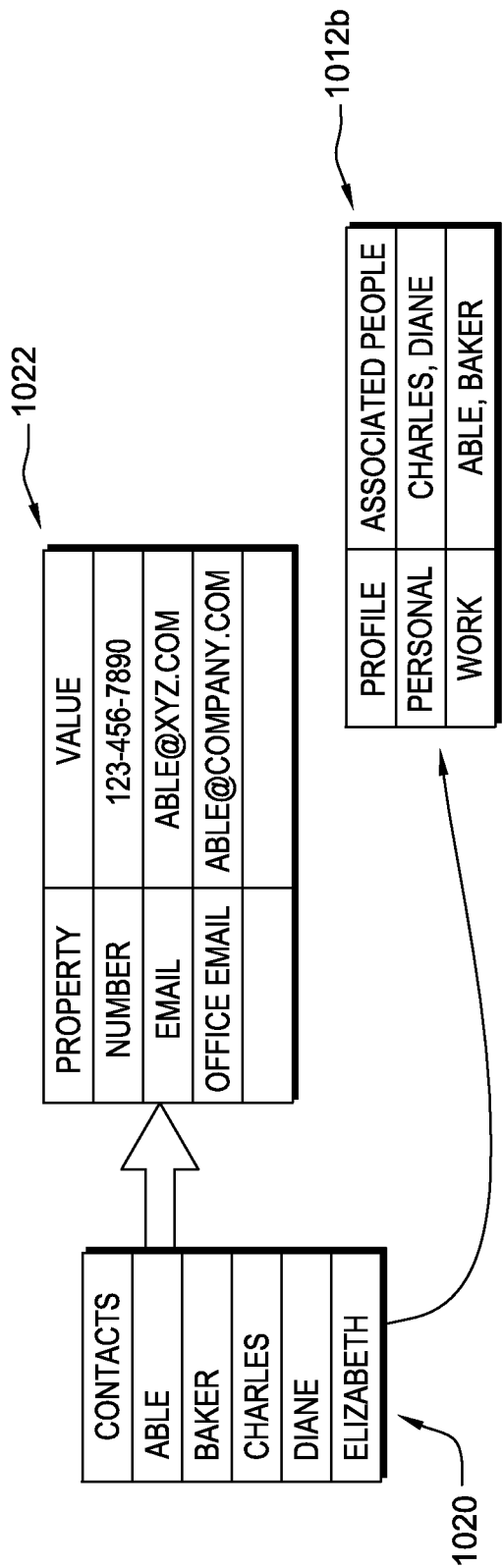
FIG. 12 is a schematic view of a portion of the second embodiment system.

FIG. 12 is a schematic view depicting contact list 1020 and corresponding profiles database 1012b and contact details 1022 associated with one contact in the contacts manager according to an embodiment of the present disclosure. The contact list includes data associated with each contact known to the contacts manager. For example, contact information for Able is shown in block 1022. Profiles database 1012b includes two profiles, "personal" and "work." The contact "Able" is associated with the work profile. Accordingly, when the personal profile is active, the user will not have access to Able's information.

Figure 13:
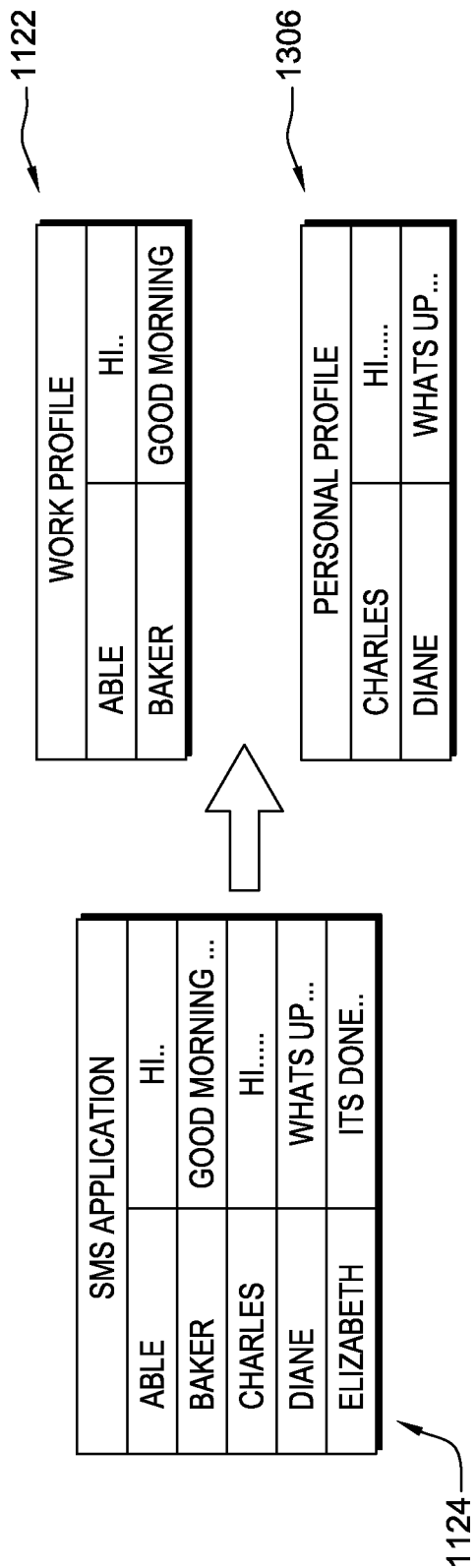
FIG. 13 is a set of screenshots generated, at least in part, by the second embodiment system.

FIG. 13 is a set of screenshots generated by an SMS application according to an embodiment of the present disclosure. General screenshot 1124 displays all content in the SMS application. Work profile screenshot 1122 displays contents as-filtered when the profile "work" is active. In this example, contacts Charles, Diane, and Elizabeth are filtered out of the display. Personal profile 1306 displays contents as-filtered when the profile "personal" is active. In this example, contacts Able, Baker, and Elizabeth are filtered out of the display.

Some embodiments of the present disclosure may include one or more of the following features, attributes, and/or characteristics: (i) a system that is able to capture the user context at a central level and is able to switch the context of a multitude of applications, providing effective filtering of application content; and (ii) a new dimension to profile management systems that allows the user to control content filtering on the various personal productivity applications in a centralized manner.

Some embodiments of the present disclosure are applicable for a personal device where there is a single user. That is, some embodiments simulate multiple usage contexts for a single user.

Some embodiments of the present disclosure provide a system that allows a single user to specify one or more contexts from several (using the notion of a profile) and subsequently make all personal productivity applications to react to the new context(s).

Some embodiments of the present disclosure provide an API through the profile management system to register and obtain details of content filtering rules specific to an application to be run on the personal device. The applications will use the content filtering rules to filter content that is displayed to the user.

Some embodiments of the present disclosure apply the content filtering rules in scenarios including: (i) when the user switches the active profile leading to a change in filtering rules (changes in the rules are pushed by the central profile management system to each application); and/or (ii) when the application loads or refreshes the data shown to the user (application initiates communication with central profile management system to get the rules).

Some embodiments of the present disclosure provide systems and methods to: (i) centrally define and link content filtering rules to individual applications (via the notion of a usage context profile); (ii) define rules based on content source (content originator or recipient) in conjunction with the participating application; and (iii) centrally manage and update the content filtering rules across multiple personal productivity applications on the device.

Some embodiments of the present disclosure recognize: (i) that corporations and institutions are advocating BYOD policies; (ii) that users prefer to use one smart device for activities including official work and personal activities; (iii) that the trends identified in items (i) and (ii) are forcing individual users to use a single device in multiple contexts.

Having to switch between contexts impedes user productivity. For example, a user may want to focus only on work-related communication, and not be alerted about personal communication. Achieving this level of control is cumbersome today, and this proposed system fills this gap by filtering for content that is relevant to a particular context.

Some embodiments of the present invention use a profile to centrally control the behavior of multiple applications.

Some embodiments of the present invention allow a user to centrally define profiles using rules based on the content originator, or content source. The rules are communicated to various personal productivity applications including: (i) e-mail; (ii) cell phone messaging; (iii) calendar; and (iv) phone log. Some embodiments of the present invention filter content are based on content origination, not just on different accounts. The notion of profile, according to some embodiments, allows finer grained control across different user accounts based on who sent the communication to the user.

Some embodiments of the present invention operate on multiple applications, as distinguished from a single social media portal web site that behaves as a single application by pre-integrating applications such as e-mail, instant messaging, and so forth. Some embodiments of the present invention help the user to define "usage context" using the notion of "context profiles" that are applied to multiple independent personal productivity applications. Context profiles allow a user to centrally define rules that are enforced across various applications.

Some embodiments of the present disclosure classify advertisers as content originators. As such, the identity of the advertiser may be the basis of application content filtering.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Software storage device: any device (or set of devices) capable of storing computer code in a manner less transient than a signal in transit; "software storage device" does not include: any device that stores computer code only as a signal; and/or a signal propagation media, such as a copper cable, an optical fiber or a wireless transmission media.

Tangible medium software storage device: any software storage device (see Definition, above) that stores the computer code in and/or on a tangible medium.

Computer: any device with significant data processing and/or machine-readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Context profile: a set of rules for filtering content based upon "content characteristics;" the selection of a context profile may be made explicitly by the user, or it may be made automatically by software based upon "contextual conditions."

Content characteristics: include, but are not limited to, identity of content originator, business of content originator, family relationship with content originator, content creation date, content word length, content subject matter, content reading level, content form (video, audio, etc.), etc.

Contextual conditions: examples of possible contextual conditions include: (i) a user's geographic location, (ii) the time of day, (iii) the identity of the login id under which the user's device is operating, (iv) volume of incoming/outgoing data from user's device, (v) volume of incoming/outgoing data from user's web-based personal productivity applications; (vi) the identity of other users with whom the user has recently communicated through the user's device.

Access/accessible: includes, but is not necessarily limited to viewing access.

What is claimed is:
1. A method for filtering application content, the method comprising:

defining a plurality of context profiles by the use of context profile rules that each respectively control which content of personal productivity applications will be accessible under each context profile;

selecting a first context profile, from the plurality of context profiles and having a first set of context profile rules, to be operative, wherein the first set of context profile rules include content filtering based on an identity of respective content originators;

applying the first set of context profile rules to control which content of a first personal productivity application is accessible;

applying the first set of context profile rules to control which content of a second personal productivity application is accessible displaying, to a user and from the first personal productivity application, only data determined to be accessible under the first set of context profile rules; and displaying, to the user and from the second personal productivity application, only data determined to be accessible under the first set of context profile rules.

2. The method of claim 1 wherein the selection of the first context profile is made by the user through a user interface.

3. The method of claim 1 wherein:

the user is in possession of a first computer;

applying the first set of context profile rules to control which content of the first personal productivity application is performed by a second computer so that only content determined, under the first set of context profile rules, to be accessible is downloaded to the first computer; and applying the first set of context profile rules to control which content of the second personal productivity application is performed by a second computer so that only content determined, under the first set of context profile rules, to be accessible is downloaded to the first computer.

4. The method of claim 1 further comprising:

registering the first personal productivity application with a registration service;

registering the second personal productivity application with the registration service;

wherein:

the registration service provides the processing hardware and machine logic to apply the first set of context profile rules to content of the first and the second personal productivity applications; and the first personal productivity application, the second personal productivity application and the registration service are all respectively administered by different entities.

* * * * *